United States Patent
Jang et al.

(10) Patent No.: US 9,774,021 B2
(45) Date of Patent: Sep. 26, 2017

(54) SEPARATOR FOR RECHARGEABLE LITHIUM BATTERY AND RECHARGEABLE LITHIUM BATTERY INCLUDING THE SAME

(71) Applicants: SAMSUNG SDI CO., LTD., Yongin-si, Gyeonggi-do (KR); SAMSUNG ELECTRONICS CO., LTD., Suwon-si, Gyeonggi-do (KR)

(72) Inventors: Jungsue Jang, Suwon-si (KR); Minho Cho, Suwon-si (KR); Hana Kim, Suwon-si (KR); Hyoungwoo Choi, Hwaseong-si (KR); Myungkook Park, Suwon-si (KR); Seungrim Yang, Seongnam-si (KR); Byung Min Lee, Suwon-si (KR); Eon-Mi Lee, Yongin-si (KR); Bo Kyung Jung, Yongin-si (KR); Sung Soo Han, Hwaseong-si (KR)

(73) Assignees: SAMSUNG SDI CO., LTD., Yongin-Si, Gyeonggi-Do (KR); SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 33 days.

(21) Appl. No.: 15/050,608

(22) Filed: Feb. 23, 2016

(65) Prior Publication Data
US 2016/0248063 A1   Aug. 25, 2016

(30) Foreign Application Priority Data

Feb. 25, 2015 (KR) .......................... 10-2015-0026797

(51) Int. Cl.
*H01M 2/16* (2006.01)
*H01M 10/052* (2010.01)

(52) U.S. Cl.
CPC ......... *H01M 2/1653* (2013.01); *H01M 2/166* (2013.01); *H01M 2/1686* (2013.01); *H01M 10/052* (2013.01)

(58) Field of Classification Search
CPC .. H01M 2/1653; H01M 2/1686; H01M 2/166; H01M 10/052
See application file for complete search history.

(56) References Cited

U.S. PATENT DOCUMENTS

2016/0204409 A1* 7/2016 Jeon ................... H01M 2/1686
429/145

FOREIGN PATENT DOCUMENTS

| JP | 2013-077385 A | 4/2013 |
|---|---|---|
| JP | 2013-109843 A | 6/2013 |

(Continued)

*Primary Examiner* — Stewart Fraser
(74) *Attorney, Agent, or Firm* — Lee & Morse, P.C.

(57) ABSTRACT

A separator for a rechargeable lithium battery and a rechargeable lithium battery, the separator including a substrate, and a heat-resistant porous layer on at least one side of the substrate, the heat-resistant porous layer including an imide-based copolymer, wherein the imide-based copolymer includes a first repeating unit represented by Chemical Formula 1 and a second repeating unit represented by Chemical Formula 2:

[Chemical Formula 1]

(Continued)

-continued

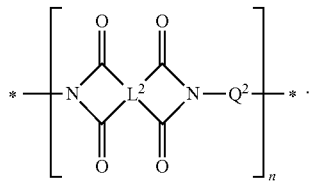

[Chemical Formula 2]

15 Claims, 1 Drawing Sheet

(56) References Cited

FOREIGN PATENT DOCUMENTS

| KR | 10-2006-0053913 A | 5/2006 |
|----|-------------------|--------|
| KR | 10-2010-0081302 A | 7/2010 |
| KR | 10-2011-0136745 A | 12/2011 |
| KR | 10 2013-0024828 A | 3/2013 |
| KR | 10-2013-0059434 A | 6/2013 |
| KR | 10-2013-0099546 A | 9/2013 |
| KR | 10-2014-0096364 A | 8/2014 |

* cited by examiner

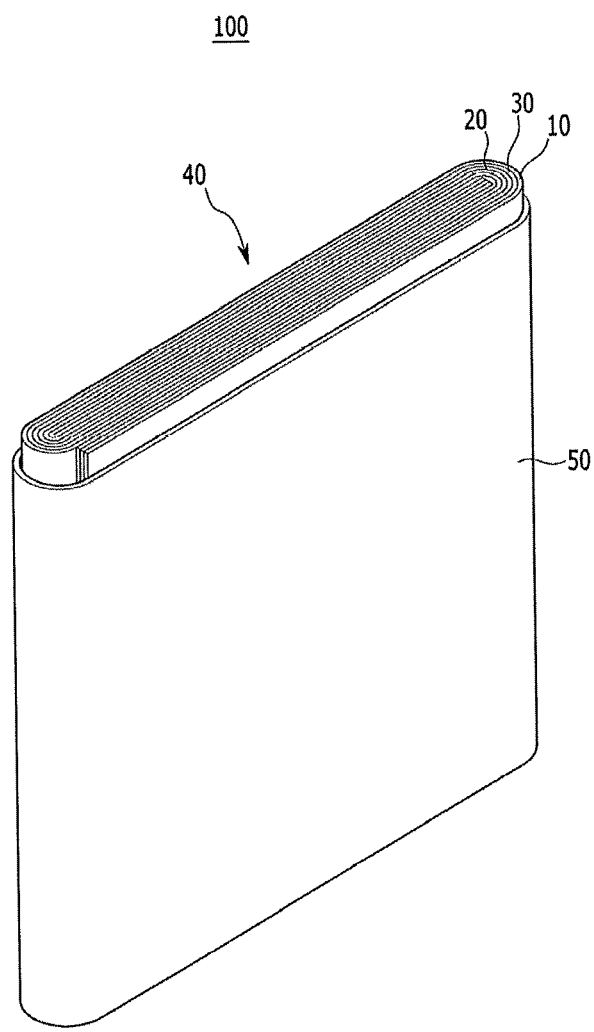

SEPARATOR FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2015-0026797, filed on Feb. 25, 2015, in the Korean Intellectual Property Office, and entitled: "Separator for Rechargeable Lithium Battery and Rechargeable Lithium Battery Including the Same," is incorporated by reference herein in its entirety.

BACKGROUND

1. Field

Embodiments relate to a separator for a rechargeable lithium battery and a rechargeable lithium battery including the same.

2. Description of the Related Art

Recently, research on a rechargeable lithium battery has been made, as use of a battery having high energy density as a power source for a portable electronic device is increased. In addition, an electric vehicle and the like is researched with an increasing interest in the environment, research on the rechargeable lithium battery as a power source for the electric vehicle has been actively made.

A rechargeable lithium battery includes a positive electrode, a negative electrode, and a separator interposed between the positive and negative electrodes. The separator plays a role of electrically insulating the positive and negative electrodes and includes micropores through which lithium ions move.

SUMMARY

Embodiments are directed to a separator for a rechargeable lithium battery and a rechargeable lithium battery including the same.

The embodiments may be realized by providing a separator for a rechargeable lithium battery, the separator including a substrate, and a heat-resistant porous layer on at least one side of the substrate, the heat-resistant porous layer including an imide-based copolymer, wherein the imide-based copolymer includes a first repeating unit represented by Chemical Formula 1 and a second repeating unit represented by Chemical Formula 2:

[Chemical Formula 1]

[Chemical Formula 2]

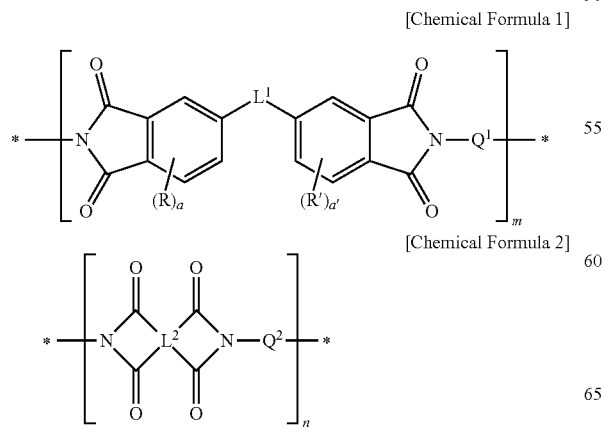

wherein, in Chemical Formulae 1 and 2, $L^1$ includes a C1 to C20 alkylene group, a C2 to C20 alkenylene group, a C2 to C20 alkynylene group, a C3 to C20 cycloalkylene group, a C3 to C20 cycloalkenylene group, a C4 to C20 cycloalkynylene group, or a C6 to C30 arylene group, in which at least one hydrogen of the alkylene group, alkenylene group, alkynylene group, cycloalkylene group, cycloalkenylene group, cycloalkynylene group, or arylene group is substituted by a fluorine atom, $L^2$ includes a tetravalent aromatic group, a tetravalent aliphatic group, or a tetravalent alicyclic group, in which the aliphatic group and the alicyclic group each independently include a linking group of a single bond, —CO—, —O—, —SO$_2$—, or —S— therein, $Q^1$ and $Q^2$ each independently include a divalent aromatic group, R and R' each independently include a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group, a and a' are each independently an integer of 0 to 3, * indicates a bonding site to an adjacent atom, and a ratio of m and n is about 1:9 to about 9:1.

In Chemical Formula 1, $L^1$ may include a C1 to C10 alkylene group substituted with at least one fluorine atom.

In Chemical Formula 2, $L^2$ may be a tetravalent linking group represented by one of Chemical Formulae 3-1 to 3-7:

[Chemical Formula 3-1]

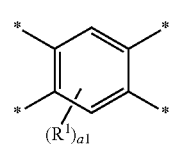

[Chemical Formula 3-2]

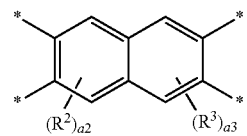

[Chemical Formula 3-3]

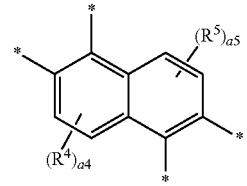

[Chemical Formula 3-4]

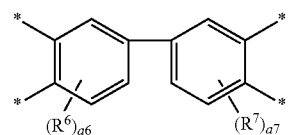

[Chemical Formula 3-5]

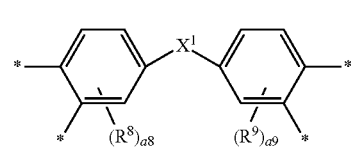

[Chemical Formula 3-6]

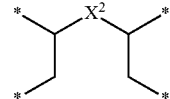

[Chemical Formula 3-7]

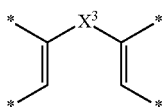

wherein, in Chemical Formulae 3-1 to 3-7, $X^1$ may be —CO—, —O—, —SO$_2$—, or —S—, $X^2$ and $X^3$ may be each independently a single bond, —CO—, —O—, —SO$_2$—, or —S—, $R^1$ to $R^9$ may each independently include a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group, * indicates a bonding site to an adjacent atom, and $a^1$ to $a^9$ may be each independently an integer of 0 to 3.

In Chemical Formula 2, $L^2$ may be a tetravalent linking group represented by one of Chemical Formulae 4-1 to 4-5:

[Chemical Formula 4-1]

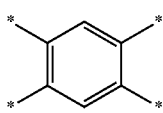

[Chemical Formula 4-2]

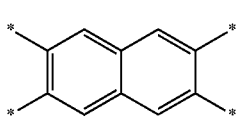

[Chemical Formula 4-3]

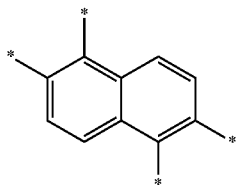

[Chemical Formula 4-4]

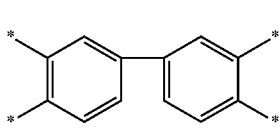

[Chemical Formula 4-5]

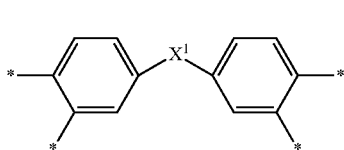

wherein, in Chemical Formula 4-5, * indicates a bonding site to an adjacent atom, and $X^1$ may be —CO—, —O—, —SO$_2$—, or —S—.

In Chemical Formulae 1 and 2, $Q^1$ and $Q^2$ may be each independently a divalent linking group represented by one of Chemical Formulae 5-1 to 5-3:

[Chemical Formula 5-1]

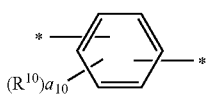

[Chemical Formula 5-2]

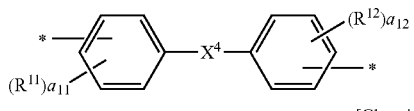

[Chemical Formula 5-3]

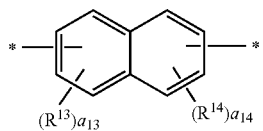

wherein, in Chemical Formulae 5-1 to 5-3, $X^4$ may be a single bond, —CO—, —O—, —SO$_2$—, —S—, a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C4 to C20 cycloalkynylene group, or a substituted or unsubstituted C6 to C30 arylene group, $R^{10}$ to $R^{14}$ may be independently include a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group, * indicates a bonding site to an adjacent atom, and $a^{10}$ to $a^{14}$ may be each independently an integer of 0 to 4.

In Chemical Formulae 1 and 2, $Q^1$ and $Q^2$ may be each independently a divalent linking group represented by Chemical Formulae 6-1 or 6-2:

[Chemical Formula 6-1]

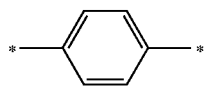

[Chemical Formula 6-2]

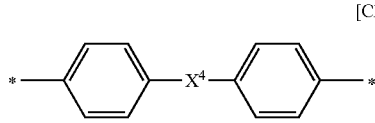

wherein, in Chemical Formula 6-2, * indicates a bonding site to an adjacent atom, and $X^4$ may be a single bond, —CO—, —O—, —SO$_2$—, —S—, or a substituted or unsubstituted C1 to C20 alkylene group.

In Chemical Formulae 1 and 2, a ratio of m and n may be about 7:3 to about 9:1.

The imide-based copolymer may have a weight average molecular weight of about 10,000 to about 500,000.

The imide-based copolymer may have a decomposition initiation temperature of about 350° C. to about 700° C. based on a thermogravimetric analysis.

The heat-resistant porous layer may further include an inorganic particle, and the inorganic particle may include $Al_2O_3$, $SiO_2$, $B_2O_3$, $Ga_2O_3$, $TiO_2$, $SnO_2$ or a combination thereof.

The inorganic particle may be present in an amount of about 50 wt % to about 95 wt %, based on a total weight of the imide-based copolymer and the inorganic particle.

The heat-resistant porous layer may further include polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof as a binder.

The inorganic particle may be present in an amount of about 75 wt % to about 95 wt %, based on a total weight of the imide-based copolymer, the inorganic particle, and the binder.

A shrinkage ratio of the separator may be less than about 5% when calculated according to Equation 1:

Shrinkage ratio (%)=[(L0−L1)/L0]×100    [Equation 1]

wherein, in Equation 1, L0 indicates an initial length of a separator and L1 indicates a length of a separator after being allowed to stand at 200° C. and for 1 hour.

The embodiments may be realized by providing a rechargeable lithium battery including the separator according to an embodiment.

BRIEF DESCRIPTION OF THE DRAWING

Features will be apparent to those of skill in the art by describing in detail exemplary embodiments with reference to the attached drawing in which:

FIG. 1 illustrates an exploded perspective view of a rechargeable lithium battery according to one embodiment.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration. It will also be understood that when a layer or element is referred to as being "on" another layer or element, it can be directly on the other layer or element, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, embodiments of the present disclosure are described in detail. However, these embodiments are exemplary, the present disclosure is not limited thereto and the present disclosure is defined by the scope of claims.

As used herein, when a definition is not otherwise provided, the term "substituted" refers to one substituted with a substituent selected from a halogen (F, Br, Cl, I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C20 alkoxy group, a C1 to C20 heteroalkyl group, a C3 to C20 heteroarylalkyl group, C3 to C20 cycloalkyl group, C3 to C20 cycloalkenyl group, a C4 to C20 cycloalkynyl group, a C2 to C20 heterocycloalkyl group, and a combination thereof, instead of hydrogen of a compound.

As used herein, when a definition is not otherwise provided, the term 'hetero' refers to one including 1 to 3 hetero atoms selected from N, O, S, and P.

Hereinafter, a separator for a rechargeable lithium battery according to one embodiment is described.

The separator for a rechargeable lithium battery according to the present embodiment separates a negative electrode and a positive electrode and provides a transporting passage for lithium ions. The separator may include a substrate and a heat-resistant porous layer on at least one side of the substrate.

The substrate may be porous due to pores. Lithium ions may be transferred through the pores. The substrate may use or include polyolefin (e.g., polyethylene or polypropylene), polyester, polytetrafluoroethylene (PTFE), a glass fiber, or a combination thereof. The substrate may be a non-woven fabric or a woven fabric. The substrate may have a single layer or multilayer structure. For example, the substrate may be a polyethylene single layer, a polypropylene single layer, a polyethylene/polypropylene double layer, a polypropylene/polyethylene/polypropylene triple layer, a polyethylene/polypropylene/polyethylene triple layer, or the like. A thickness of the substrate may be about 1 µm to about 40 µm, e.g., about 1 µm to about 30 µm, about 1 µm to about 20 µm, about 5 µm to about 20 µm, or about 5 µm to about 10 µm. When the thickness of the substrate is within the range, short-circuit between a positive electrode and a negative electrode may be prevented without increasing internal resistance of a battery.

The heat-resistant porous layer may be formed on one side or both sides of the substrate, and may include an imide-based, e.g., imide-containing, copolymer.

The imide-based copolymer may include, e.g., a first repeating unit represented by represented by Chemical Formula 1 and a second repeating unit represented by Chemical Formula 2.

[Chemical Formula 1]

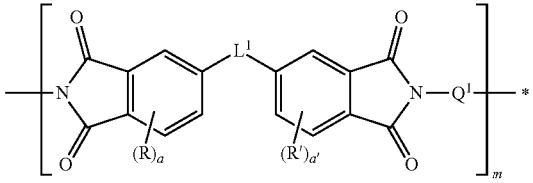

[Chemical Formula 2]

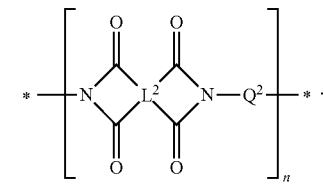

For example, when the imide-based copolymer having the structure described above is used to form a heat-resistant porous layer, a separator having improved heat resistance may be secured, realizing a stable rechargeable lithium battery during the battery explosion and overheating.

In an implementation, in Chemical Formula 1, L' may be, e.g., a C1 to C20 alkylene group, a C2 to C20 alkenylene group, a C2 to C20 alkynylene group, a C3 to C20 cycloalkylene group, a C3 to C20 cycloalkenylene group, a C4 to C20 cycloalkynylene group, or a C6 to C30 arylene group. In an implementation, at least one hydrogen of each alkylene group, alkenylene group, alkynylene group, cycloalkylene group, cycloalkenylene group, cycloalkynylene group, and arylene group may be replaced by or substituted with a fluorine (F) atom. This may be, e.g., derived from a diphthalic anhydride having an F-containing substituent.

In Chemical Formulae 1 and 2, * indicates a bonding site to a neighboring atom.

In this way, the imide-based copolymer may include a first repeating unit having an F-containing substituent and thus may help improve solubility in an organic solvent, e.g., a low-boiling-point solvent, when the heat-resistant porous layer of the separator is formed.

In an implementation, $L^1$ may be, e.g., a C1 to C10 alkylene group substituted with at least one fluorine (F) atom. In an implementation, hydrogen of the alkylene group may be replaced by F at a ratio of, e.g., about 10% to about 99%, about 30% to about 99%, about 50% to about 99% and the like.

In an implementation, fluorine (F) may be present in an amount of about 1 wt % to about 30 wt %, e.g., about 15 wt % to about 25 wt %, based on a total weight of the first repeating unit. In an implementation, fluorine (F) may be present in an amount of about 1 wt % to about 30 wt %, e.g., about 5 wt % to about 20 wt %, based on a total weight of the imide-based copolymer. When the fluorine (F) is present within the range, solubility in an organic solvent used for formation of a separator, e.g., a low-boiling-point solvent, may be improved.

In Chemical Formula 2, $L^2$ may be or may include, e.g., a tetravalent aromatic group, a tetravalent aliphatic group, or a tetravalent alicyclic group. In an implementation, the aliphatic group and the alicyclic group may each independently include a linking group of, e.g., —CO—, —O—, —SO$_2$—, or —S— therein. This may be, e.g., derived from a hydride having the substituents.

As the imide-based copolymer includes the second repeating unit, solvent resistance of the separator according to the embodiment for an electrolyte solution may be improved.

In an implementation, $L^2$ may be or may include, e.g., a tetravalent linking groups represented by one of the following Chemical Formulae 3-1 to 3-7. For example, the tetravalent aromatic group may be or may include a linking group represented by one of Chemical Formulae 3-1 to 3-5, and the tetravalent aliphatic group may be or may include a linking group represented by one of Chemical Formulae 3-6 and 3-7.

[Chemical Formula 3-1]

[Chemical Formula 3-2]

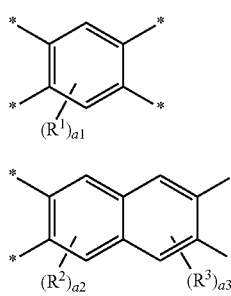

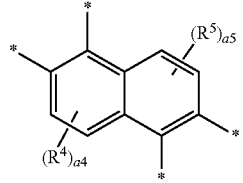

[Chemical Formula 3-3]

[Chemical Formula 3-4]

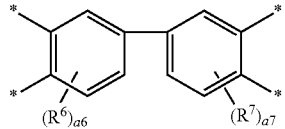

[Chemical Formula 3-5]

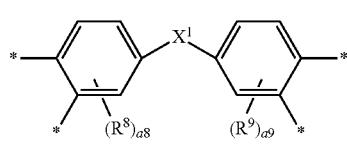

[Chemical Formula 3-6]

[Chemical Formula 3-7]

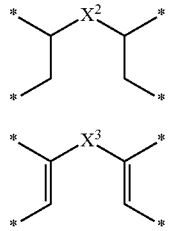

In Chemical Formulae 3-1 to 3-7, $X^1$ is —CO—, —O—, —SO$_2$—, or —S—, $X^2$ and $X^3$ may each independently be, e.g., a linking group of a single bond, —CO—, —O—, —SO$_2$—, or —S—, $R^1$ to $R^9$ may each independently be, e.g., a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group,

* indicates a bonding site to a neighboring atom, and $a^1$ to $a^9$ may each independently be, e.g., an integer of 0 to 3.

In an implementation, $L^2$ may be, e.g., a tetravalent linking group represented by one of the following Chemical Formulae 4-1 to 4-5.

[Chemical Formula 4-1]

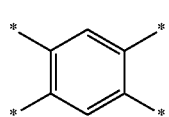

[Chemical Formula 4-2]

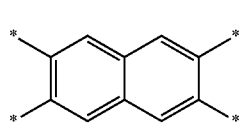

[Chemical Formula 4-3]

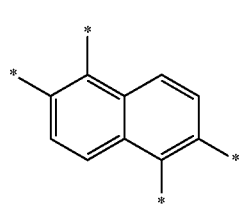

[Chemical Formula 4-4]

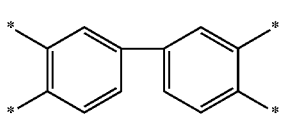

[Chemical Formula 4-5]

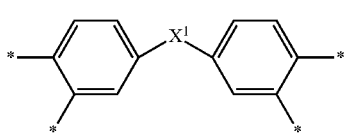

In Chemical Formula 4-5, $X^1$ is, e.g., —CO—, —O—, —$SO_2$—, or —S—, and * indicates a bonding site to a neighboring atom.

In Chemical Formulae 1 and 2, $Q^1$ and $Q^2$ may each independently be or include, e.g., a divalent aromatic group. This may be, e.g. derived from a diisocyanate or diamine having an aromatic group. As the moiety derived from the diisocyanate or diamine having an aromatic group includes the first repeating unit and the second repeating unit, a separator formed using the imide-based copolymer having such a structure may have more improved heat resistance.

In an implementation, $Q^1$ and $Q^2$ may each independently include, e.g., a divalent linking groups represented by one of the following Chemical Formulae 5-1 to 5-3.

[Chemical Formula 5-1]

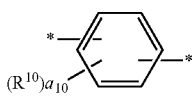

[Chemical Formula 5-2]

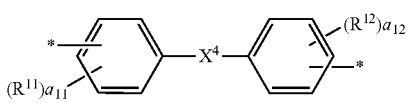

[Chemical Formula 5-3]

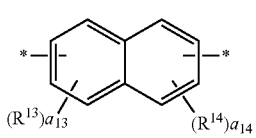

In Chemical Formulae 5-1 to 5-3, $X^4$ may be or may include, e.g., a single bond, —CO—, —O—, —$SO_2$—, —S—, a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C4 to C20 cycloalkynylene group, or a substituted or unsubstituted C6 to C30 arylene group, $R^{10}$ to $R^{14}$ may each independently be, e.g., a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group,

* indicates a bonding site to a neighboring atom, and $a^{10}$ to $a^{14}$ may each independently be, e.g., an integer of 0 to 4.

In an implementation, $Q^1$ and $Q^2$ may each independently be, e.g., a divalent linking group represented by Chemical Formulae 6-1 or 6-2.

[Chemical Formula 6-1]

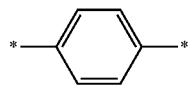

[Chemical Formula 6-2]

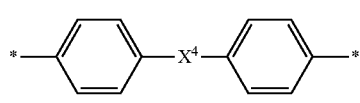

In Chemical Formula 6-2, $X^4$ may be or may include, e.g., a single bond, —CO—, —O—, —$SO_2$—, —S—, or a substituted or unsubstituted C1 to C20 alkylene group, and * indicates a bonding site to a neighboring atom.

For example, the first repeating unit may have a moiety derived from diphthalic anhydride and a moiety derived from diisocyanate or diamine and thus may contribute to improving solubility in a low-boiling-point solvent during formation of the separator as well as heat resistance of the separator. In addition, the second repeating unit may have a moiety derived from dianhydride and a moiety derived from diisocyanate or diamine and thus may contribute to improving solvent resistance against an electrolyte solution as well as heat resistance of the separator. Accordingly, an imide-based copolymer including the first repeating unit and the second repeating unit may have excellent heat resistance and may help secure excellent solubility in a low boiling point solvent while simultaneously having excellent solvent resistance against an electrolyte solution. Thus a separator having a heat-resistant porous layer formed by using the imide-based copolymer may have all improved processability, stability with respect to the electrolyte solution, and heat resistance. In addition, a rechargeable lithium battery manufactured using the separator may realize excellent stability and battery performance.

In Chemical Formula 1, R and R' may each independently be, e.g., a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group.

A ratio of m of Chemical Formula 1 and n of Chemical Formula 2 (e.g., a mole ratio of repeating units represented by Chemical Formula 1 to repeating units represented by Chemical Formula 2) may be about 1:9 to about 9:1, e.g., about 7:3 to about 9:1. When the first repeating unit and the second repeating unit are included in a mole ratio within the range, not only may excellent solubility in a low boiling point solvent and excellent solvent resistance against an electrolyte solution be secured, but excellent heat resistance may also be obtained.

The first repeating unit and the second repeating unit may provide a block, alternate, or random copolymer.

The imide-based copolymer including the first repeating unit represented by Chemical Formula 1 and the second repeating unit represented by Chemical Formula 2 may have a weight average molecular weight of about 10,000 to about 500,000, e.g., about 50,000 to about 200,000. When the imide-based copolymer has a weight average molecular weight within the range, excellent solubility in a low boiling point solvent and excellent solvent resistance against an electrolyte solution may be simultaneously secured, and excellent heat resistance may be obtained.

The imide-based copolymer may be prepared by mixing each monomer, e.g., diphthalic anhydride having a fluorine-containing substituent, dianhydride, diisocyanate, and/or diamine. Herein, each monomer may be simultaneously or sequentially provided.

In an implementation, a diphthalic anhydride having a fluorine-containing substituent, a dianhydride, and a solvent may be mixed to prepare a first solution. In addition, a diisocyanate or a diamine and a solvent may be mixed to prepare a second solution. Subsequently, the first solution and the second solution may be mixed and stirred while heating the resultant, and a product may be precipitated with deionized water, and thereby the imide-based copolymer may be prepared.

In an implementation, diphthalic anhydride having a fluorine-containing substituent and a solvent may be mixed to prepare a first solution. A diisocyanate or a diamine and a solvent may be mixed to prepare a second solution. A dianhydride and a solvent may be mixed to prepare a third solution. Subsequently, the first solution and the second solution may be mixed and stirred while heating the resultant, the mixture of the first solution and the second solution and the third solution may be mixed and stirred while heating the resultant, and a product may be precipitated with deionized water, and thereby the imide-based copolymer may be prepared.

Examples of the diphthalic anhydride having a fluorine-containing substituent may include 4,4'-(hexafluoroisopropylidene)diphthalic anhydride (6FDA), or other suitable diphthalic anhydrides having a fluorine-containing substituent. Examples of the dianhydride may include pyromellitic dianhydride (PMDA), or other suitable dianhydride compounds. Examples of the diisocyanate may include methylene diphenyl diisocyanate (MDI), p-phenylene diisocyanate (PPDI), and the like or other suitable diisocyanate compounds. The solvent may include, e.g., N-methyl-2-pyrrolidone (NMP).

The diphthalic anhydride having a fluorine-containing substituent and the dianhydride may be mixed in a weight ratio of about 1:9 to about 19:1, e.g., about 3:1 to about 18:1. The diphthalic anhydride having a fluorine-containing substituent may form a structure of the first repeating unit represented by Chemical Formula 1, and the dianhydride may form a structure of the second repeating unit represented by Chemical Formula 2 in the imide-based copolymer. When the diphthalic anhydride and the dianhydride are mixed within the weight ratio range, excellent solubility in a low boiling point solvent and excellent solvent resistance against an electrolyte solution may be simultaneously secured, and excellent heat resistance about an electrolyte solution may be obtained.

The imide-based copolymer may have a decomposition initiation temperature of about 350° C. to about 700° C., e.g., about 400° C. to about 550° C., as determined using thermogravimetric analysis (TGA). When the imide-based copolymer has a decomposition initiation temperature within the range, a separator formed by using the imide-based copolymer may secure excellent processability, stability, and heat resistance in an electrolyte solution.

In an implementation, the imide-based copolymer may be used singularly as a binder of the heat-resistant porous layer.

A thickness of the heat-resistant porous layer may be about 0.01 µm to about 20 µm, e.g., about 1 µm to about 10 µm or about 1 µm to about 5 µm. When the heat-resistant porous layer has a thickness within the range, the heat-resistant porous layer may have excellent heat resistance and thus may help suppress the internal resistance increase of a battery as well as the internal short circuit of the battery and secure a stable separator.

Hereinafter, a separator for a rechargeable lithium battery according to another embodiment is described.

A separator for a rechargeable lithium battery according to the present embodiment may include a substrate and a heat-resistant porous layer on at least one side of the substrate. The heat-resistant porous layer may include a binder and an inorganic particle. Herein, the binder may be the imide-based copolymer. The separator of the present embodiment may include an inorganic particle and thus differs from the separator for a rechargeable lithium battery of the above embodiment, even though the other constituent elements may be substantially the same, and herein, the inorganic particle is described.

When the inorganic particle is added to the heat-resistant porous layer, occurrence of a short-circuit between positive and negative electrodes may be suppressed by further preventing shrinkage of a substrate due to heat, and performance of a battery may be improved by minimizing resistance of lithium ions.

In an implementation, the inorganic particle may include, e.g., $Al_2O_3$, $SiO_2$, $B_2O_3$, $Ga_2O_3$, $TiO_2$, $SnO_2$, or a combination thereof.

An average particle diameter of the inorganic particle may be about 1 nm to about 2,000 nm, e.g., about 100 nm to about 1000 nm or about 100 nm to about 500 nm. In an implementation, more than two kinds of inorganic particles having different particle diameters may be mixed and used. When the inorganic particle has an average particle diameter within the range, uniform coating on a substrate may be obtained during formation of a heat-resistant porous layer, short-circuit between positive and negative electrodes may be suppressed, and performance of a rechargeable lithium battery may be secured by minimizing resistance of lithium ions.

An amount of the inorganic particle included in the heat-resistant porous layer may be about 50 wt % to about 95 wt %, e.g., about 50 wt % to about 80 wt %, based on a total weight of the heat-resistant porous layer, e.g., based on a total weight of the imide-based copolymer and the inorganic particle. When the inorganic particle is included within the amount range, battery performance may be improved by preventing the shrinkage of a substrate and suppressing short-circuit between positive and negative electrodes.

Hereinafter, a separator for a rechargeable lithium battery according to another embodiment is described.

The separator for a rechargeable lithium battery according to the present embodiment may include a substrate and a heat-resistant porous layer on at least one side of the substrate. The heat-resistant porous layer may include a first binder and a second binder different from the first binder. In an implementation, the heat resistance porous layer may further include an inorganic particle.

The first binder may be the imide-based copolymer. The separator of the present embodiment may include a second binder and thus differs from the separator for a rechargeable lithium battery of the other embodiments even though the other constituent elements may be substantially the same, and herein, the second binder will be described.

The second binder may be a compound that is different from the imide-based copolymer. In an implementation, the second binder may include, e.g., polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, carboxylmethyl cellulose, acrylonitrile-styrene-butadiene copolymer, or a combination thereof. For example, polyvinylidene fluoride (PVdF), a polyvinylidene fluoride-hexafluoropropylene (PVdF-HFP) copolymer, or a combination thereof may be used. When the polyvinylidene fluoride (PVdF), the polyvinylidene fluoride-hexafluoropropylene (PVdF-HFP) copolymer, or the combination thereof is used with the imide-based copolymer, a heat-resistant porous layer may be uniformly formed by further improving adherence to a substrate, securing a safer separator. In addition, excellent impregnation in an electrolyte solution may be secured, improving high-rate charge and discharge characteristics of a battery.

The polyvinylidene fluoride (PVdF) may have a weight average molecular weight (Mw) of greater than or equal to about 600,000, e.g., greater than or equal to about 1,000,000 or about 1,000,000 to about 1,200,000. When the polyvinylidene fluoride (PVdF) has a weight average molecular weight within the range, adherence of the substrate to the heat-resistant porous layer may not only be further reinforced, but adherence to an electrode may be improved. In addition, the substrate may be suppressed from a shrinkage due to heat, and a short circuit between positive and negative electrodes may be prevented. In addition, the polyvinylidene fluoride (PVdF) may be well dissolved in a small amount of a solvent during formation of a heat-resistant porous layer and thus may facilitate drying of the heat-resistant porous layer. The polyvinylidene fluoride-hexafluoropropylene (PVdF-HFP) copolymer may have a weight average molecular weight of less than or equal to about 800,000, e.g., a weight average molecular weight of about 500,000 to about 800,000. When the polyvinylidene fluoride-hexafluoropropylene (PVdF-HFP) copolymer has a weight average molecular weight within the range, excellent impregnation of an electrolyte solution may be obtained, thereby realizing a rechargeable lithium battery having improved high-rate charge and discharge characteristics. In an implementation, the polyvinylidene fluoride-hexafluoropropylene (PVdF-HFP) copolymer may include about 0.1 wt % to about 40 wt % of a repeating unit derived from hexafluoropropylene (based on the total amount of a repeating unit derived from vinylidenefluoride) and a repeating unit derived from hexafluoropropylene.

The first binder (e.g., the imide-based copolymer) may be present in an amount of about 10 wt % to about 95 wt %, e.g., about 40 wt % to about 60 wt %, based on a total weight of the first binder and the second binder. When the imide-based copolymer is included within this amount, excellent processability and stability in an electrolyte solution during formation of a separator as well as excellent heat resistance may be obtained, and adherence to the substrate may be reinforced, resultantly securing a much more stable separator.

In addition, when the inorganic particle is further included (in addition to the first and second binders), the inorganic particle may be included in an amount of about 75 wt % to about 95 wt %, e.g., about 83 wt % to about 93 wt %, based on a total weight of the first binder, the second binder, and the inorganic particle. When the inorganic particle is included within this amount, battery performance may be improved by preventing shrinkage of a substrate due to heat and suppressing a short-circuit between positive and negative electrodes.

A shrinkage ratio of the separator may be less than about 5%, e.g., about 0% to about 3%, according to the following Equation 1. Accordingly, a stable rechargeable lithium battery during battery explosion and battery overheating may be realized.

$$\text{Shrinkage ratio (\%)} = [(L0-L1)/L0] \times 100 \qquad \text{[Equation 1]}$$

In the Equation 1, L0 indicates an initial length of a separator and L1 indicates a length of a separator after being allowed to stand at 200° C. and for 1 hour.

Hereinafter, a method of manufacturing a separator for a rechargeable lithium battery according to one embodiment is described. A method of manufacturing the separator according to the present embodiment may include coating a coating composition (including an imide-based copolymer and a solvent) on at least one side of a substrate and drying it to form a heat-resistant porous layer. The imide-based copolymer may be the imide-based copolymer according to the aforementioned embodiments. In an implementation, the coating composition may further include an inorganic particle and/or a second binder that is different from the imide-based copolymer.

The solvent may be classified into a low boiling point solvent and a high boiling point solvent. The low boiling point solvent may have a boiling point of less than or equal to about 90° C., and the high boiling point solvent may have a boiling point of greater than about 90° C. For example, the low boiling point solvent may include alcohols such as methanol, ethanol, isopropyl alcohol, and the like; ketones such as acetone and the like, and the high boiling point solvent may include N-methylpyrrolidone (NMP), dimethyl acetamide (DMAc), and the like.

According to one embodiment, the solvent used to form the heat-resistant porous layer of a separator may mainly include the low boiling point solvent, e.g., in an amount of greater than or equal to about 85 wt % based on a total weight of the solvent. The low boiling point solvent may have large volatility and may be dried at a relatively low temperature and thus may do less damage on a substrate and be even more efficiently dried. If the high boiling point solvent were to be mainly used, the solvent may not be easily volatile and may remain in a heat-resistant porous layer and thus may have an influence on deteriorating properties such as heat resistance and the like. Accordingly, the above imide-based copolymer may secure a separator having excellent properties such as heat resistance and the like as well as excellent solubility in the low boiling point solvent. For example, excellent solubility in the low boiling point solvent means that a precipitate is not produced, even after 85 wt % of the low boiling point solvent such as acetone and the like based on the total amount of the solvents is added to the high boiling point solvent such as NMP and the like after the imide-based copolymer is dissolved in the high boiling point solvent.

The coating composition may be obtained by mixing about 1 wt % to about 30 wt % of the imide-based copolymer and the solvent as a balance and stirring the mixture at about 10° C. to about 40° C. for about 30 minutes to about 5 hours. The stirring may be performed with a ball mill, a beads mill, a screw mixer, and the like.

The coating composition may be coated be, e.g., dip coating, die coating, roll coating, comma coating, or the like.

The drying may be performed by drying with warm air, hot air, or low humid air, vacuum-drying, or radiation of a far-infrared ray, an electron beam, or the like. The drying may be performed at about 60° C. to about 120° C. When the drying is performed within the temperature range, a heat-resistant porous layer having a smooth surface may be formed, even though the drying is not performed for a long time.

In an implementation, the heat-resistant porous layer may be formed on a substrate by lamination, coextrusion, or the like (e.g., other than the coating of the coating composition).

Hereinafter, a rechargeable lithium battery including the separator is illustrated referring to FIG. 1.

FIG. 1 illustrates an exploded perspective view of a rechargeable lithium battery according to one embodiment. A prismatic rechargeable lithium battery according to one embodiment is for example illustrated. However, the separator may be applied to various batteries such as a lithium polymer battery and a cylindrical battery.

Referring to FIG. 1, a rechargeable lithium battery 100 according to one embodiment may include an electrode assembly 40 in which a separator 30 interposed between a positive electrode 10 and a negative electrode 20, and a case 50 housing the electrode assembly 40. The positive electrode 10, the negative electrode 20, and the separator 30 may be impregnated in an electrolyte solution.

The separator 30 may be the same as described above according to an embodiment.

The positive electrode 10 may include a positive current collector and a positive active material layer formed on the positive current collector. The positive active material layer may include a positive active material, a binder, and optionally a conductive material.

The positive current collector may include aluminum (Al), nickel (Ni), or the like.

The positive active material may include a compound capable of intercalating and deintercallating lithium. For example, at least one of a composite oxide or a composite phosphate of a metal selected from cobalt, manganese, nickel, aluminum, iron, or a combination thereof and lithium may be used. In an implementation, the positive active material may include lithium cobalt oxide, lithium nickel oxide, lithium manganese oxide, lithium nickel cobalt manganese oxide, lithium nickel cobalt aluminum oxide, lithium iron phosphate, or a combination thereof.

The binder may help improve binding properties of positive active material particles with one another and with a current collector. Examples may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. These may be used singularly or as a mixture of two or more.

The conductive material may help improve conductivity of an electrode. Examples thereof may include natural graphite, artificial graphite, carbon black, a carbon fiber, a metal powder, a metal fiber, and the like. These may be used singularly or as a mixture of two or more. The metal powder and the metal fiber may use a metal of copper, nickel, aluminum, silver, and the like.

The negative electrode 20 may include a negative current collector and a negative active material layer formed on the negative current collector.

The negative current collector may include copper (Cu), gold (Au), nickel (Ni), a copper alloy, or the like.

The negative active material layer may include a negative active material, a binder, and optionally a conductive material.

The negative active material may include a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may include a suitable carbon material, and examples thereof may include crystalline carbon, amorphous carbon, or a combination thereof. Examples of the crystalline carbon may include graphite such as amorphous, sheet-shape, flake, spherical shape or fiber-shaped natural graphite or artificial graphite. Examples of the amorphous carbon may include soft carbon (low temperature fired carbon) or hard carbon, a mesophase pitch carbonized product, fired coke, and the like. The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may include Si, $SiO_x$ (0<x<2), a Si—C composite, a Si—Y alloy, Sn, $SnO_2$, a Sn—C composite, a Sn—Y, and the like, and at least one of these may be mixed with $SiO_2$. Specific examples of the element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may include vanadium oxide, lithium vanadium oxide, or the like.

The binder and the conductive material included in the negative electrode may be the same as the binder and conductive material of the positive electrode.

The positive electrode and the negative electrode may be manufactured by mixing each active material composition including each active material and a binder (and optionally a conductive material) in a solvent, and coating the active material composition on each current collector. Herein, the solvent may include N-methylpyrrolidone or the like.

The electrolyte solution may include an organic solvent and a lithium salt.

The organic solvent serves as a medium for transmitting ions taking part in the electrochemical reaction of a battery. Specific examples thereof may include a carbonate-based solvent, an ester-based solvent, an ether-based solvent, a ketone-based solvent, an alcohol-based solvent, and an aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. For example, when the linear carbonate compounds and cyclic carbonate compounds are mixed, an organic solvent having a high dielectric constant and a low viscosity may be provided. The cyclic carbonate compound and the linear carbonate compound may be mixed together in a volume ratio ranging from about 1:1 to about 1:9.

Examples of the ester-based solvent may include methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may include cyclohexanone, and the like, and examples of the alcohol-based solvent may include ethanol, isopropyl alcohol, and the like.

The organic solvent may be used singularly or in a mixture of two or more, and when the organic solvent is used in a mixture of two or more, the mixture ratio may be controlled in accordance with a desirable battery performance.

The lithium salt may be dissolved in an organic solvent, supplies lithium ions in a battery, basically operates the rechargeable lithium battery, and improves lithium ion transportation between positive and negative electrodes therein.

Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1} SO_2)(C_yF_{2y+1}SO_2)$, x and y are natural numbers, LiCl, LiI, $LiB(C_2O_4)_2$, or a combination thereof.

The lithium salt may be used in a concentration of about 0.1 M to about 2.0 M. When the lithium salt is included within the above concentration range, an electrolyte may have excellent performance and lithium ion mobility due to optimal electrolyte conductivity and viscosity.

The rechargeable lithium battery including the separator may realize high capacity without degradation of cycle-life characteristics.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Hereinafter, the embodiments are illustrated in more detail with reference to examples. However, these examples are exemplary, and the present disclosure is not limited thereto. Furthermore, what is not described in this disclosure may be sufficiently understood by those who have knowledge in this field and will not be illustrated here.

Synthesis of Imide-Based Copolymer

Synthesis Example 1

A first solution was prepared by putting 16.0 g of 4,4'-(hexafluoroisopropylidene)diphthalic anhydride (6FDA) (TOKYO CHEMICAL INDUSTRY), 0.9 g of pyromellitic dianhydride (PMDA) (TOKYO CHEMICAL INDUSTRY), and 50 g of N-methyl-2-pyrrolidone (NMP) in a mechanical agitator under a nitrogen stream and stirring the mixture until all the components were dissolved. A second solution was prepared by putting 10 g of methylene diphenyl diisocyanate (MDI) (TOKYO CHEMICAL INDUSTRY) and 50 g of N-methyl-2-pyrrolidone (NMP) in a mechanical agitator under a nitrogen stream and stirring the mixture until all the components were dissolved. The first and second solutions were mixed and thermally stirred at 100° C. for 1 hour, and a product was precipitated with an excessive amount of deionized water to remove a non-reactant and an organic solvent remaining therein and dried under a reduced pressure, synthesizing an imide-based copolymer including a structural unit represented by Chemical Formula 7. The synthesized imide-based copolymer had a weight average molecular weight (Mw) of 166,630.

[Chemical Formula 7]

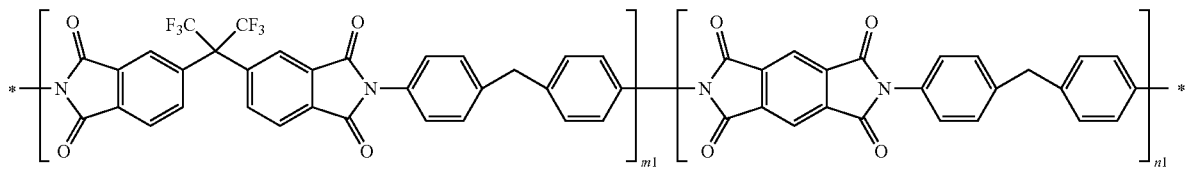

In Chemical Formula 7, a ratio of $m^1$ and $n^1$ was 9:1.

Synthesis Examples 2 and 3 and Comparative Synthesis Examples 1 and 2

Imide-Based Copolymers Having a Structural Unit Represented by Chemical

Formula 7 were synthesized according to the same method as Synthesis Example 1 except for adjusting the amounts of 6FDA and PMDA as provided in Table 1, below.

Synthesis Example 4

A first solution was prepared by adding 10.7 g of 4,4'-(hexafluoroisopropylidene)diphthalic anhydride (6FDA) (TOKYO CHEMICAL INDUSTRY) and 30 g of N-methyl-2-pyrrolidone (NMP) in a mechanical agitator under a nitrogen stream and stirring the mixture until the components were dissolved. A second solution was prepared by putting 10 g of methylene diphenyl diisocyanate (MDI) (TOKYO CHEMICAL INDUSTRY) and 50 g of N-methyl-2-pyrrolidone (NMP) in a mechanical agitator under a nitrogen stream and stirring the mixture until the components were dissolved. A third solution was prepared by putting 3.6 g of pyromellitic dianhydride (PMDA) (TOKYO CHEMICAL INDUSTRY) and 20 g of N-methyl-2-pyrrolidone (NMP) in a mechanical agitator under a nitrogen stream and stirring the mixture until the components were dissolved. The first and second solutions were mixed and thermally stirred at 100° C. for 30 minutes and then mixed with the third solution. The resulting mixture was thermally stirred at 100° C. for 30 minutes, and a product was precipitated with an excessive amount of deionized water to remove a non-reactant and an organic solvent remaining therein and dried under a reduced pressure, synthesizing an imide-based copolymer including a structural unit represented by Chemical Formula 7.

Synthesis Example 5 and 6

Imide-based copolymers including a structural unit represented by Chemical Formula 7 were prepared according to the same method as Synthesis Example 4 except for adjusting the amount of 6FDA and PMDA as provided in Table 1.

TABLE 1

|  | Amount of 6FDA (g) | Amount of PMDA (g) | $m^1:n^1$ ratio | Mw of imide-based copolymer |
| --- | --- | --- | --- | --- |
| Synthesis Example 1 | 16.0 | 0.9 | 9:1 | 166,630 |
| Synthesis Example 2 | 14.2 | 1.8 | 8:2 | 161,540 |
| Synthesis Example 3 | 12.5 | 2.7 | 7:3 | 152,570 |
| Synthesis Example 4 | 10.7 | 3.6 | 6:4 | 83,562 |
| Synthesis Example 5 | 8.9 | 4.5 | 5:5 | 83,601 |
| Synthesis Example 6 | 7.1 | 5.4 | 4:6 | 78,322 |
| Comparative Synthesis Example 1 | 17.8 | 0.0 | 10:0 | 163,430 |
| Comparative Synthesis Example 2 | 0.0 | 8.7 | 0:10 | — |

TABLE 2

|  | Amount of 6FDA (g) | Amount of PMDA (g) | $m^2:n^2$ ratio | Mw of imide-based copolymer |
| --- | --- | --- | --- | --- |
| Synthesis Example 7 | 12.5 | 0.7 | 9:1 | 59,511 |
| Synthesis Example 8 | 11.1 | 1.3 | 8:2 | 57,116 |
| Synthesis Example 9 | 9.7 | 2.0 | 7:3 | 56,912 |
| Synthesis Example 10 | 8.3 | 2.7 | 6:4 | 56,225- |
| Comparative Synthesis Example 3 | 13.9 | 0.0 | 10:0 | 107,324 |
| Comparative Synthesis Example 4 | 0.0 | 6.8 | 0:10 | — |

Synthesis Example 7

A first solution was prepared by putting 12.5 g of 4,4'-(hexafluoroisopropylidene)diphthalic anhydride (6FDA) (TOKYO CHEMICAL INDUSTRY) and 30 g of N-methyl-2-pyrrolidone (NMP) in a mechanical agitator under a nitrogen stream and stirring the mixture until the components were dissolved. A second solution was prepared by putting 5 g of p-phenylene diisocyanate (PPDI) and 20 g of N-methyl-2-pyrrolidone (NMP) in a mechanical agitator under a nitrogen stream and stirring the mixture until the components were dissolved. A third solution was prepared by putting 0.7 g of pyromellitic dianhydride (PMDA) (TOKYO CHEMICAL INDUSTRY) and 10 g of N-methyl-2-pyrrolidone (NMP) in a mechanical agitator under a nitrogen stream and stirring the mixture until the components were dissolved. The first and second solutions were mixed and thermally stirred at 100° C. for 30 minutes and then mixed with the third solution. The resulting mixture was thermally stirred at 100° C. for 30 minutes, and a product was precipitated with an excessive amount of deionized water to remove a non-reactant and an organic solvent remaining therein and dried under a reduced pressure, synthesizing an imide-based copolymer including a structural unit represented by Chemical Formula 8. The synthesized imide-based copolymer had a weight average molecular weight (Mw) of 59,511.

Manufacture of Separator

Example 1

15 wt % of the imide-based copolymer according to Synthesis Example 1 was mixed with 85 wt % of N-methyl-2-pyrrolidone (NMP), obtaining a first binder solution. A second binder solution was obtained by mixing 7 wt % of a polyvinylidene fluoride-hexafluoropropylene (PVdF-HFP) copolymer (KUREHA Corporation, KF 9300), 45 wt % of dimethyl acetamide (DMAc), and 48 wt % of acetone in an agitator at 40° C. for 4 hours. Furthermore, an inorganic dispersion was obtained by mixing 25 wt % of $Al_2O_3$ and 75 wt % of acetone through a bead mill at 25° C. for 2 hours. The first binder solution, the second binder solution, and the inorganic dispersion were mixed to prepare a slurry. The slurry was composed of 0.57 wt % of the imide-based copolymer, 0.57 wt % of the PVdF-HFP copolymer, 13.86 wt % of $Al_2O_3$, 3.2 wt % of NMP, 3.7 wt % of DMAc, and 78.1 wt % of acetone.

The slurry was dip-coated on both sides of a 7 µm-thick polyethylene single layer film to be respectively 2 µm thick, 4 pin thick in total and then, dried at 80° C. and a speed of 10 m/s, manufacturing a separator.

Examples 2 to 10 and Comparative Examples 1 to 4

A separator was manufactured according to the same method as Example 1 except for preparing slurry by using each imide-based copolymer according to Synthesis Examples 2 to 10 and Comparative Synthesis Examples 1 to 4 instead of the imide-based copolymer according to Synthesis Example 1.

Example 11

A binder solution was obtained by mixing 50 wt % of the imide-based copolymer of Synthesis Example 1 and 50 wt % of N-methyl-2-pyrrolidone (NMP). 6 wt % of the binder solution was mixed with 94 wt % of acetone, preparing a

[Chemical Formula 8]

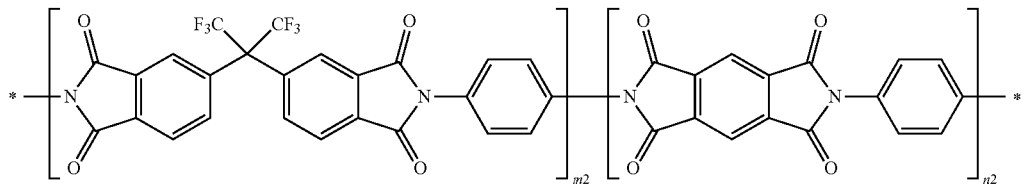

In Chemical Formula 8, a ratio of $m^2$ and $n^2$ was 9:1.

Synthesis Examples 8 to 10 and Comparative Synthesis Examples 3 and 4

Imide-based copolymers including a structural unit represented by Chemical Formula 8 were prepared according to the same method as Synthesis Example 7 except for adjusting the amounts of 6FDA and PMDA as provided in Table 2, below.

slurry. Herein, the slurry was composed of 3 wt % of the imide-based copolymer, 3 wt % of the NMP, and 94 wt % of acetone. The slurry was dip-coated on both sides of a 7 μm-thick polyethylene single film substrate to be respectively 2 μm thick, 4 μm thick in total and dried at 80° C. and a speed of 10 m/s, manufacturing a separator.

Examples 12 to 20 and Comparative Examples 5 to 8

A separator was manufactured according to the same method as Example 11 except for preparing slurry by using each imide-based copolymer according to Synthesis Examples 2 to 10 and Comparative Synthesis Examples 1 to 4 instead of the imide-based copolymer according to Synthesis Example 1.

(Manufacture of Rechargeable Lithium Battery Cell)

LiCoO$_2$, polyvinylidene fluoride, and carbon black in a weight of 96:2:2 were added to an N-methylpyrrolidone (NMP) solvent, preparing a slurry. The slurry was coated on an aluminum (Al) thin film and dried, manufacturing a positive electrode.

Graphite, polyvinylidene fluoride, and carbon black in a weight ratio of 98:1:1 were added to an N-methylpyrrolidone (NMP) solvent, preparing a slurry. The slurry was coated on a copper foil, dried, and compressed, manufacturing a negative electrode.

An electrolyte solution was prepared by mixing ethylene carbonate (EC), ethylmethyl carbonate (EMC), and diethyl carbonate (DEC) in a volume ratio of 3:5:2 preparing a 1.15 M LiPF$_6$ solution in the mixed solvent.

The positive and negative electrodes, the electrolyte solution, each separator according to Examples 1 to 20 and Comparative Examples 1 to 8 were used, manufacturing each rechargeable lithium battery cell.

Evaluation 1: Solubility of Imide-Based Copolymer

Solubility of the imide-based copolymers of Synthesis Examples 1 to 10 and Comparative Synthesis Examples 1 to 4 in each solvent was measured according to the following method, and the results are provided in Table 3, below.

The solubility of the imide-based copolymers in NMP and the electrolyte solution was evaluated as follows. One g of each imide-based copolymer was respectively dissolved in 10 g of NMP and 10 g of the electrolyte solution solvent (a mixed solvent of EC, EMC, and DEC) and then, examined with naked eyes. In Table 3, when a solid was all dissolved without precipitation, ○, when a solid was partially precipitated, A, and when most of a solid was not dissolved but rather precipitated, X.

The solubility of the imide-based copolymers in acetone was evaluated by dissolving 1 g of the imide-based copolymer in 10 g of NMP and gradually adding acetone thereto. In Table 3, when the acetone was added in an amount of greater than or equal to 85 wt % based on the total amount of a solvent, and a solid was all dissolved without precipitation, ○, when the acetone was added in an amount of greater than or equal to 50 wt % based on the total amount of a solvent, and a solid was precipitated, A, and when the acetone was added in an amount of less than 50 wt % based on the total amount of a solvent, a solid was precipitated, X.

TABLE 3

| | Repeating unit ratio | Solubility | | |
|---|---|---|---|---|
| | | NMP | acetone | electrolyte solution |
| Synthesis Example 1 | $m^1:n^1 = 9:1$ | ○ | ○ | X |
| Synthesis Example 2 | $m^1:n^1 = 8:2$ | ○ | ○ | X |
| Synthesis Example 3 | $m^1:n^1 = 7:3$ | ○ | ○ | X |
| Synthesis Example 4 | $m^1:n^1 = 6:4$ | ○ | Δ | X |
| Synthesis Example 5 | $m^1:n^1 = 5:5$ | ○ | Δ | X |
| Synthesis Example 6 | $m^1:n^1 = 4:6$ | ○ | Δ | X |
| Comparative Synthesis Example 1 | $m^1:n^1 = 10:0$ | ○ | ○ | ○ |
| Comparative Synthesis Example 2 | $m^1:n^1 = 0:10$ | X | X | X |
| Synthesis Example 7 | $m^2:n^2 = 9:1$ | ○ | ○ | X |
| Synthesis Example 8 | $m^2:n^2 = 8:2$ | ○ | ○ | X |
| Synthesis Example 9 | $m^2:n^2 = 7:3$ | ○ | ○ | X |
| Synthesis Example 10 | $m^2:n^2 = 6:4$ | ○ | Δ | X |
| Comparative Synthesis Example 3 | $m^2:n^2 = 10:0$ | ○ | ○ | ○ |
| Comparative Synthesis Example 4 | $m^2:n^2 = 0:10$ | X | X | X |

Referring to Table 3, the imide-based copolymers according to Synthesis Examples 1 to 10 had high solubility in an organic solvent and specifically, a solvent having a low boiling point used for forming a separator and simultaneously, low solubility in an electrolyte solution. Accordingly, a separator having a heat-resistant porous layer formed using the imide-based copolymer on a substrate showed improved processability and stability about the electrolyte solution.

The imide-based copolymers according to Comparative Synthesis Examples 1 and 3 showed high solubility in the solvent having a low boiling point solvent but high solubility in the electrolyte solution. Accordingly, the imide-based copolymer was dissolved in the electrolyte solution and thus might not be applied to a rechargeable lithium battery cell.

Evaluation 2: Heat Resistance of Separator

Heat resistance of the separators according to Examples 1 to 20 and Comparative Examples 1 to 8 was evaluated by measuring a shrinkage ratio about heat, and the results are provided in Table 4, below.

Each sample was prepared by respectively cutting the separators into a size of 10 cm×10 cm, allowed to stand in a convection oven set at a temperature of 200° C. for one hour, measuring its shrinkage ratio. The shrinkage ratio was calculated according to the following equation 1.

$$\text{Shrinkage ratio (\%)} = [(L0-L1)/L0] \times 100 \quad \text{[Equation 1]}$$

In Equation 1, L0 indicates an initial length of the separator and L1 indicates a length of the separator after being allowed to stand at 200° C. for 1 hour.

TABLE 4

| | Imide-based copolymer | Heat-resistant porous layer | Shrinkage ratio (%) |
|---|---|---|---|
| Example 1 | Synthesis Example 1 | imide-based copolymer + PVdF-HFP + Al$_2$O$_3$ | <1 |
| Example 2 | Synthesis Example 2 | imide-based copolymer + PVdF-HFP + Al$_2$O$_3$ | <1 |
| Example 3 | Synthesis Example 3 | imide-based copolymer + PVdF-HFP + Al$_2$O$_3$ | <1 |
| Example 7 | Synthesis Example 7 | imide-based copolymer + PVdF-HFP + Al$_2$O$_3$ | <1 |
| Example 8 | Synthesis Example 8 | imide-based copolymer + PVdF-HFP + Al$_2$O$_3$ | <1 |
| Example 9 | Synthesis Example 9 | imide-based copolymer + PVdF-HFP + Al$_2$O$_3$ | <1 |

TABLE 4-continued

| | Imide-based copolymer | Heat-resistant porous layer | Shrinkage ratio (%) |
|---|---|---|---|
| Example 10 | Synthesis Example 10 | imide-based copolymer + PVdF-HFP + Al$_2$O$_3$ | <1 |
| Example 11 | Synthesis Example 1 | imide-based copolymer | <1 |
| Example 12 | Synthesis Example 2 | imide-based copolymer | <1 |
| Example 13 | Synthesis Example 3 | imide-based copolymer | <1 |
| Example 17 | Synthesis Example 7 | imide-based copolymer | <1 |
| Example 18 | Synthesis Example 8 | imide-based copolymer | <1 |
| Example 19 | Synthesis Example 9 | imide-based copolymer | <1 |
| Example 20 | Synthesis Example 10 | imide-based copolymer | <1 |

Referring to Table 4, a separator formed by using an imide-based copolymer according to an embodiment had a low shrinkage ratio in response to heat and thus excellent heat resistance. Accordingly, when the separator is applied to a rechargeable lithium battery cell, the rechargeable lithium battery cell may have stability during battery explosion and overheating.

By way of summation and review, a separator helps provide excellent battery stability in terms of exothermicity, as a battery tends to be lighter and down-sized and keeps requiring of high capacity as a power source having high power/large capacity for the electric vehicle. For a battery, a separator formed by coating a binder resin and a ceramic particle on a porous substrate may be used. However, some separators may be unable to secure stability due to a shrinkage during overheating of the battery.

The embodiments may provide a separator for a rechargeable lithium battery that has improved solubility in an organic solvent, e.g., a low-boiling-point solvent, and simultaneously, improved solvent resistance against an electrolyte solution as well as excellent heat resistance.

The embodiments may provide a rechargeable lithium battery having improved stability and battery performance by including the separator.

The embodiments may provide a separator for a rechargeable lithium battery which has improved solubility for an organic solvent and specifically, a low-boiling-point solvent, and simultaneously, excellent solvent resistance against an electrolyte solution as well as improved heat resistance and thus may realize a rechargeable lithium battery having stability and excellent performance.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A separator for a rechargeable lithium battery, the separator comprising:
a substrate, and
a heat-resistant porous layer on at least one side of the substrate, the heat-resistant porous layer including an imide-based copolymer,
wherein the imide-based copolymer includes a first repeating unit represented by Chemical Formula 1 and a second repeating unit represented by Chemical Formula 2:

[Chemical Formula 1]

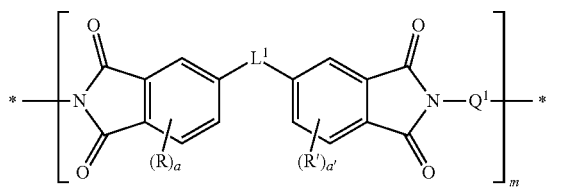

[Chemical Formula 2]

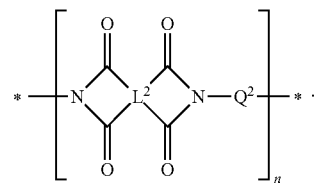

wherein, in Chemical Formulae 1 and 2,
L$^1$ includes a C1 to C20 alkylene group, a C2 to C20 alkenylene group, a C2 to C20 alkynylene group, a C3 to C20 cycloalkylene group, a C3 to C20 cycloalkenylene group, a C4 to C20 cycloalkynylene group, or a C6 to C30 arylene group, in which at least one hydrogen of the alkylene group, alkenylene group, alkynylene group, cycloalkylene group, cycloalkenylene group, cycloalkynylene group, or arylene group is substituted by a fluorine atom,
L$^2$ includes a tetravalent aromatic group, a tetravalent aliphatic group, or a tetravalent alicyclic group, in which the aliphatic group and the alicyclic group each independently include a linking group of a single bond, —CO—, —O—, —SO$_2$—, or —S— therein,
Q$^1$ and Q$^2$ each independently include a divalent aromatic group,
R and R' each independently include a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group,
a and a' are each independently an integer of 0 to 3,
* indicates a bonding site to an adjacent atom, and
a ratio of m and n is about 1:9 to about 9:1.
2. The separator as claimed in claim 1, wherein, in Chemical Formula 1, L$^1$ includes a C1 to C10 alkylene group substituted with at least one fluorine atom.
3. The separator as claimed in claim 1, wherein, in Chemical Formula 2, L$^2$ is a tetravalent linking group represented by one of Chemical Formulae 3-1 to 3-7:

[Chemical Formula 3-1]

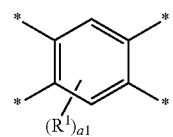

-continued

[Chemical Formula 3-2]
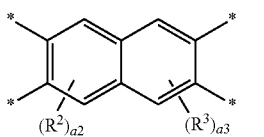

[Chemical Formula 3-3]
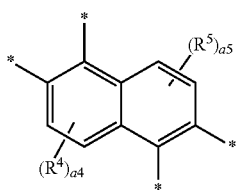

[Chemical Formula 3-4]
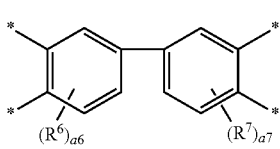

[Chemical Formula 3-5]
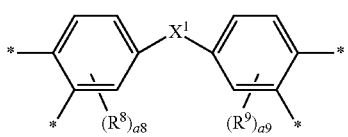

[Chemical Formula 3-6]
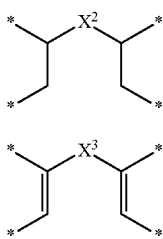

[Chemical Formula 3-7]
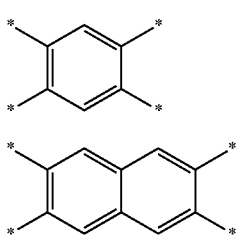

wherein, in Chemical Formulae 3-1 to 3-7,
$X^1$ is —CO—, —O—, —SO$_2$—, or —S—,
$X^2$ and $X^3$ are each independently a single bond, —CO—, —O—, —SO$_2$—, or —S—,
$R^1$ to $R^9$ each independently include a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group,
* indicates a bonding site to an adjacent atom, and
$a^1$ to $a^9$ are each independently an integer of 0 to 3.

4. The separator as claimed in claim 1, wherein, in Chemical Formula 2, $L^2$ is a tetravalent linking group represented by one of Chemical Formulae 4-1 to 4-5:

[Chemical Formula 4-1]
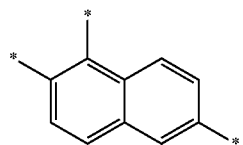

[Chemical Formula 4-2]
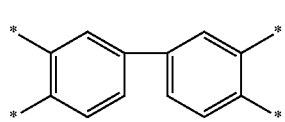

-continued

[Chemical Formula 4-3]
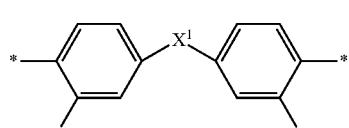

[Chemical Formula 4-4]
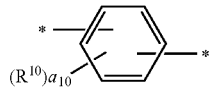

[Chemical Formula 4-5]
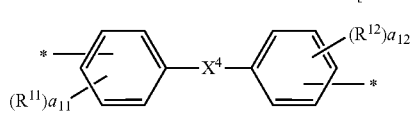

wherein, in Chemical Formula 4-5,
* indicates a bonding site to an adjacent atom, and
$X^1$ is —CO—, —O—, —SO$_2$—, or —S—.

5. The separator as claimed in claim 1, wherein, in Chemical Formulae 1 and 2, $Q^1$ and $Q^2$ are each independently a divalent linking group represented by one of Chemical Formulae 5-1 to 5-3:

[Chemical Formula 5-1]

[Chemical Formula 5-2]

[Chemical Formula 5-3]
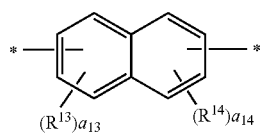

wherein, in Chemical Formulae 5-1 to 5-3,
$X^4$ is a single bond, —CO—, —O—, —SO$_2$—, —S—, a substituted or unsubstituted C1 to C20 alkylene group, a substituted or unsubstituted C2 to C20 alkenylene group, a substituted or unsubstituted C2 to C20 alkynylene group, a substituted or unsubstituted C3 to C20 cycloalkylene group, a substituted or unsubstituted C3 to C20 cycloalkenylene group, a substituted or unsubstituted C4 to C20 cycloalkynylene group, or a substituted or unsubstituted C6 to C30 arylene group,
$R^{10}$ to $R^{14}$ each independently include a C1 to C20 alkyl group, a C2 to C20 alkenyl group, a C2 to C20 alkynyl group, a C3 to C20 cycloalkyl group, a C3 to C20 cycloalkenyl group, a C4 to C20 cycloalkynyl group, or a C6 to C30 aryl group,
* indicates a bonding site to an adjacent atom, and
$a^{10}$ to $a^{14}$ are each independently an integer of 0 to 4.

6. The separator as claimed in claim 1, wherein, in Chemical Formulae 1 and 2, $Q^1$ and $Q^2$ are each independently a divalent linking group represented by Chemical Formulae 6-1 or 6-2:

[Chemical Formula 6-1]

[Chemical Formula 6-2]

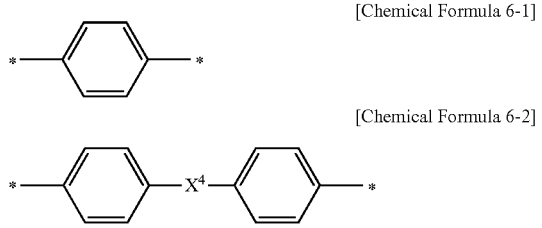

wherein, in Chemical Formula 6-2,
* indicates a bonding site to an adjacent atom, and
$X^4$ is a single bond, —CO—, —O—, —$SO_2$—, —S—, or a substituted or unsubstituted C1 to C20 alkylene group.

7. The separator as claimed in claim 1, wherein, in Chemical Formulae 1 and 2, a ratio of m and n is about 7:3 to about 9:1.

8. The separator as claimed in claim 1, wherein the imide-based copolymer has a weight average molecular weight of about 10,000 to about 500,000.

9. The separator as claimed in claim 1, wherein the imide-based copolymer has a decomposition initiation temperature of about 350° C. to about 700° C. based on a thermogravimetric analysis.

10. The separator as claimed in claim 1, wherein:
the heat-resistant porous layer further includes an inorganic particle, and
the inorganic particle includes $Al_2O_3$, $SiO_2$, $B_2O_3$, $Ga_2O_3$, $TiO_2$, $SnO_2$ or a combination thereof.

11. The separator as claimed in claim 10, wherein the inorganic particle is present in an amount of about 50 wt % to about 95 wt %, based on a total weight of the imide-based copolymer and the inorganic particle.

12. The separator as claimed in claim 10, wherein the heat-resistant porous layer further includes polyvinylidene fluoride (PVdF), a polyvinylidene fluoride-hexafluoropropylene (PVdF-HFP) copolymer, polymethylmethacrylate, polyacrylonitrile, polyvinylpyrrolidone, polyvinylacetate, polyethylene-vinylacetate copolymer, polyethyleneoxide, cellulose acetate, cellulose acetate butyrate, cellulose acetate propionate, cyanoethylpullulan, cyanoethylpolyvinyl alcohol, cyanoethyl cellulose, cyanoethylsucrose, pullulan, carboxylmethyl cellulose, an acrylonitrile-styrene-butadiene copolymer, or a combination thereof as a binder.

13. The separator as claimed in claim 12, wherein the inorganic particle is present in an amount of about 75 wt % to about 95 wt %, based on a total weight of the imide-based copolymer, the inorganic particle, and the binder.

14. The separator as claimed in claim 1, wherein a shrinkage ratio of the separator is less than about 5% when calculated according to Equation 1:

$$\text{Shrinkage ratio (\%)} = [(L0-L1)/L0] \times 100 \qquad [\text{Equation 1}]$$

wherein, in Equation 1, L0 indicates an initial length of a separator and L1 indicates a length of a separator after being allowed to stand at 200° C. and for 1 hour.

15. A rechargeable lithium battery comprising the separator as claimed in claim 1.

* * * * *